United States Patent [19]

Lesage

[11] Patent Number: 4,948,948
[45] Date of Patent: Aug. 14, 1990

[54] WATER HEATER WITH MULTIPLE HEATING ELEMENTS HAVING DIFFERENT POWER

[76] Inventor: Claude Lesage, 215 Bord du Lac, Pointe-Claire, Quebec, Canada, H9S 4K2

[21] Appl. No.: 355,671

[22] Filed: May 23, 1989

[51] Int. Cl.$^5$ ............................. F24H 1/20; H05B 1/02
[52] U.S. Cl. ...................................... 219/329; 219/334
[58] Field of Search ............... 219/321, 329, 320, 330, 219/334, 485

[56] References Cited

U.S. PATENT DOCUMENTS

| | | | |
|---|---|---|---|
| 1,996,625 | 4/1935 | Pendleton | 219/334 |
| 2,157,910 | 5/1939 | McCormick | 219/330 |
| 2,377,440 | 6/1945 | Ostherheld | 219/321 |
| 3,353,002 | 11/1967 | Macoicz et al. | 219/330 |
| 4,023,043 | 5/1977 | Stevenson | 219/485 |

FOREIGN PATENT DOCUMENTS

| | | | |
|---|---|---|---|
| 129551 | 7/1985 | Japan | 219/334 |
| 142148 | 7/1985 | Japan | 219/334 |

Primary Examiner—A. D. Pellinen
Assistant Examiner—Geoffrey S. Evans

[57] ABSTRACT

A water heater comprised of a tank having a water reservoir defined therein. The tank has a water feed inlet and a hot water outlet. A first resistive heating element is disposed in an upper part portion of the reservoir to heat a first volume of water. A second heating element is disposed in a lower part of the reservoir for heating a larger volume of water. A still further heating element is disposed intermediate the first and second elements. Second and third resistive heating elements have power ratings which are much smaller than or equal to the first heating element to consume less electrical energy during high peak periods of the day and save on the demand of energy during those high peak demand periods of the day. An optical automatic control circuit controls the supply of the electric power to the second and third resistive heating elements to energize them during a predetermined time period of day outside the peak electrical demand hours, so as to cut down on the power demand by the water tank during any period of the day.

6 Claims, 1 Drawing Sheet

WATER HEATER WITH MULTIPLE HEATING ELEMENTS HAVING DIFFERENT POWER

BACKGROUND OF THE INVENTION:

1. Field of Invention

The present invention relates to an improved water heater having several resistive heating elements of different power factors and wherein these elements are controlled by a control circuit whereby to operate at different periods of a day in order to reduce the power loads on an electrical distribution network during peak electrical demand periods of the day.

2. Description of Prior Art

It is well established that 80% of the population is satisfied with a hot water tank having a 40 Imperial gallon capacity. It is also known that of the remaining 20%, 19% are satisfied with a 60 Imp. gal. tank capacity, and 1% with 100 Imp. gal. tank capacity. Electrical hot water tanks are heated with resistive heating elements having a power factor rating of 3000 or 4500W, and these heating elements are operative as soon as the consumer utilizes 4 gallons of hot water from the reservoir. Accordingly, during peak hours when hot water is used, normally in certain periods of time between 6:00 a.m. and 9:00 p.m., there is an excessive demand of power from the distribution network. This is a problem that electrical utilities have faced for a long time and have yet not found an adequate solution. Various devices have been developed, but not utilized effectively to cut out entirely specific electrical appliances during peak demand periods in order to alleviate the problem. However, cutting out electrical appliances, such as hot water heating tanks, is not a popular solution and can often have drastic effects. Systems were developed to shut off such devices during these peak demand periods, for example, the use of a transmission signal on transmission cables, or else the transmission of radio frequencies by local radio stations to actuate electronic switching circuits coupled to the hot water heaters to shut them off and reactivate them. One can imagine the problems that can occur whenever RF signals erroneously trigger the electronic circuits to shut off appliances or when persons are deprived of essential appliances.

SUMMARY OF INVENTION:

It is a feature of the present invention to provide a water heater comprised of two or more heating elements of different power ratings, and which are operable by an automatic control timing circuit whereby to substantially cut down the power demand on the distribution network at any time of day whereby to overcome all of the above-mentioned disadvantages of the prior art.

Another feature of the present invention is to provide a water heater having three separate spaced apart resistive heating elements with a top one of the resistive elements having the highest power rating for heating a small volume of water in the top portion of the reservoir so as to alleviate power demands during peak load periods on an electrical distribution network.

According to the above features, from a broad aspect, the present invention provides a water heater comprising a tank having a water reservoir defined therein. Connection means is provided to feed water to the reservoir. A hot water outlet pipe is connected to the reservoir. A first heating element is provided in the reservoir and disposed in a top part thereof to heat a first volume of water. A second heating element is provided in a lower part of the reservoir for heating a larger volume of water. The second heating element has a power rating which is much smaller than the first heating element. Automatic control by timing of any nature prefixed or remote control or circuit remote control means can be added to supply electricity to the second or third or both resistive elements at the discretion of a power supplying company.

According to a further broad aspect of the present invention there is provided a third heating element disposed in the reservoir intermediate the first and second heating elements for heating a third volume of water. The third heating element has a power rating which is also smaller than the power rating of the first heating element.

According to a still further broad aspect of the present invention the combined power rating of the second and third resistive heating elements is equal or less than the power rating of the first resistive heating element and are operated to suit the local power utility.

BRIEF DESCRIPTION OF DRAWINGS:

A preferred embodiment of the present invention will now be described with reference to the example thereof illustrated in the accompanying drawings in which.

Figures 1, 2:
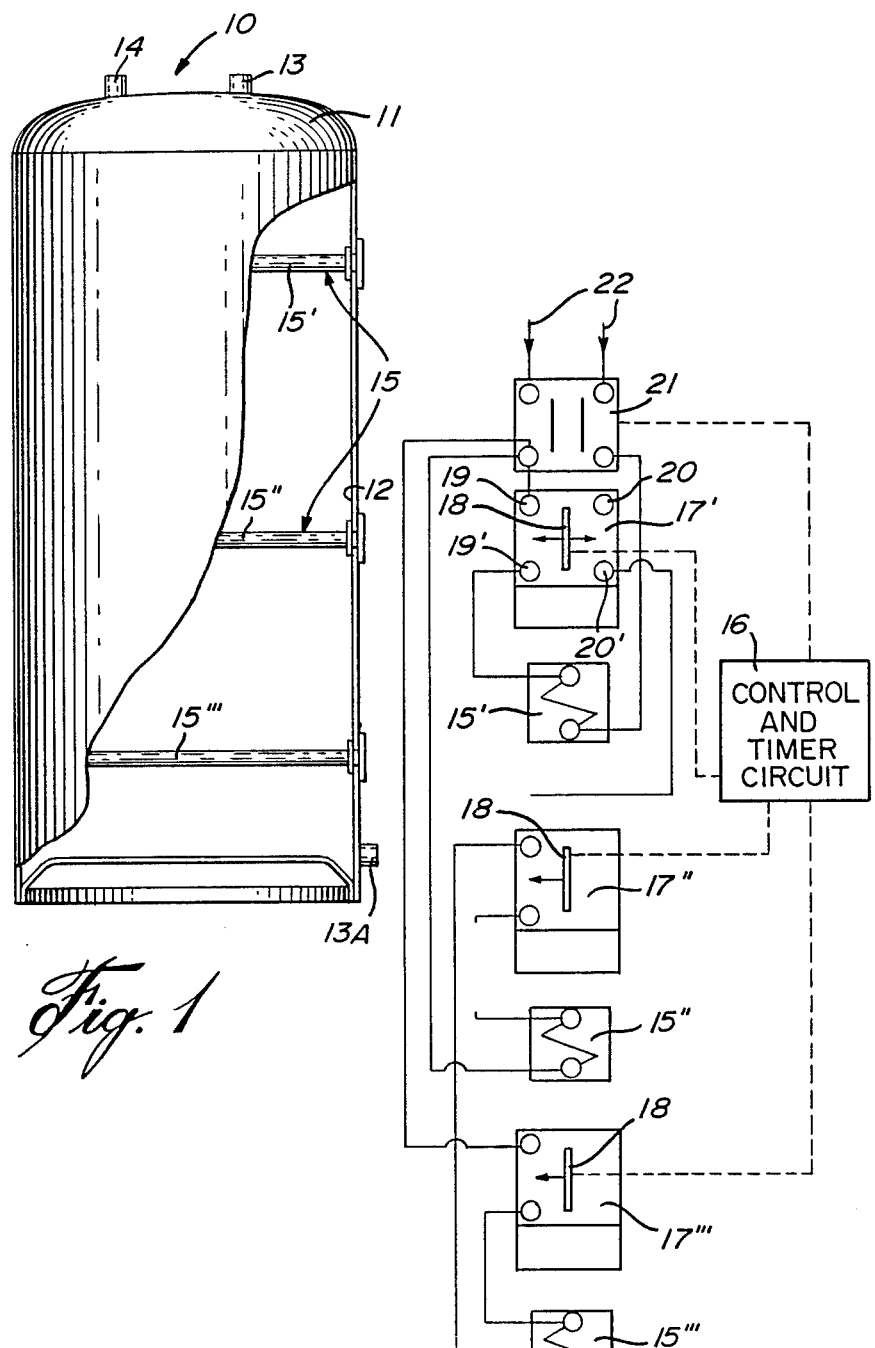
FIG. 1 is a fragmented side view of the hot water reservoir showing the locations of the resistive heating elements disposed therein.
FIG. 2 is a schematic view showing an example of a control and timing circuit associated with the resistive heating elements although other configuration of wiring with different switches are also possible.

DESCRIPTION OF PREFERRED EMBODIMENTS:

According to the drawings, and more particularly to FIG. 1, there is shown generally at 10 the water heater of the present invention and consisting essentially of a tank 11 defining at the interior thereof a water reservoir 12. An input connection 13 or 13A feeds water from a water supply conduit (not shown) to the tank to be heated therein. A hot water outlet connection 14 supplies the hot water to the user. As herein shown, a plurality, herein three, resistive heating elements 15 heat the water supplied to the reservoir 12.

Usually, hot water tanks are constructed with a heating element provided at the top and bottom, and both elements have the same power factor rating, usually 3000W to 4500W. As soon as a small quantity of water, usually 10%, is taken from the tank the resistive elements are switched on to heat the water contained therein. The elements remain "on" if water continues to be taken from the reservoir and therefore must heat the entire volume of water in the tank to a predetermined temperature before it is switched "off" by a thermostat (not shown), and connected in a manner well known in the art.

In order to alleviate the problem of excess demand on the electrical distribution network during peak consumption hours of a day, the resistive heating elements, as herein shown, have different power factor ratings and are located at predetermined spaced apart positions along the vertical axis of the tank whereby to heat different volumes of water contained therein. As herein shown, the top resistive element 15' is located at a level in the uppermost portion of the tank and will heat approximately 12 gal. of water in the uppermost portion of the tank. Thus, only 20% of the volume of water in the tank is heated by the top resistive element 15' which has the largest power rating. In a typical embodiment where the tank is a 60-gal. tank, the top resistive element 15' has a power rating of 3800W to 4500W or more. The middle resistive element 15" is located substantially at the midrange level of the reservoir 12 (at approximately the 30 gal. level) and it has a power rating of 1500W or more which is less than the top resistive element 15'. Finally, the lowermost resistive element 15''' is located close to the bottom of the reservoir and has a power rating of 800W or more.

When one considers that the power utilities have a very low demand for power between the hours of 8:00 p.m. and 7:00 a.m., there is available a period of 10.5 hours during which the water in the reservoirs can be heated by consuming very little energy due to this long period of time which can be used to heat the water. Thus, water should be heated during this period of time so that during the excessive demand periods, which occur between 7:00 a.m. and 8:00 p.m. very little energy will be required to heat the water tanks as the water in their reservoirs is already raised to a usable temperature.

Experiments have shown that a 1000W-rated resistive element will heat 20 gal. of water in 6-hours/30-min while a 2800W-element requires 3-hours/40-min to heat 28 gal. A 3800W-element requires 1-hour/10-min to heat 12 gal. Accordingly, the electrical distribution network with the present heater would have a maximum demand of 4500W (when the top element is "on"), and this is quite acceptable as the 60-gal. water tanks presently on the market which have two 3800W or more resistive elements operating in flip flop. Accordingly, during peak demand the water tank of the present invention would require no more than average power from the distribution network.

Referring now to FIG. 2 there will be described the construction and operation of the control and timing circuit. A first switching element 17' is provided a double-throw switch provided with an extra pair of terminals 20 and 20'. The switch arm 18 must bridge terminals 20 and 20' for the other resistive elements 15" and 15''' to function. In that position the first resistive element is disconnected. When the switch arms and terminals of the other two switches are closed, their associated resistive elements become operative. When the arm 18 of switch 17' is displaced to bridge terminals 19 and 19' only the first resistive element 15' is operative and the other two are disconnected.

In a particular application, depending on the power ratings of the second and third resistive elements, both of these two elements may be energized during non-peak load demand period to heat the water in the reservoir. The control and timer circuit 16 automatically switches these switches 17', 17" and 17''' so that the lower wattage elements function during low demand periods.

As also shown in FIG. 2, a limit control switch 21 is provided to cut off the power from the heater when this is required. It is connected to the supply lines 22.

It is within the ambit of the present invention to cover any obvious modifications of the particular example described herein, provided such modifications fall within the scope of the appended claims. For example, there may only be two resistive elements of different power ratings, or there could be more than three resistive elements. The resistive elements could be operated individually or in combination with others by conveniently arranged switching means. The water reservoir can have any capacity and the resistive elements may be connected at various levels in the reservoir, but in all applications the heating element having the highest power factor must be located in at least the top portion of the reservoir whereby to provide effective use of the present invention to thereby reduce power demand by water heaters during peak load demand periods on electrical distribution networks. The arrangement of the resistive heating elements must be operated sequentially to reduce the power demand from the distribution network.

I claim:

1. A water heater comprising a tank having a water reservoir defined therein, connection means to feed water to said reservoir, a hot water outlet pipe connected to said reservoir, three electrical heating elements spaced apart in said reservoir, a first of said heating element being disposed in a top part of said reservoir to heat a first volume of water, a second heating element in a lower part of said reservoir for heating a larger volume of water, said second heating element having a power rating which is much smaller than said first heating element, a third heating element disposed in said reservoir intermediate said first and second heating elements for heating a third volume of water, said third heating element having a power rating intermediate the power rating of said first and second heating element, and the total power rating of said second and third heating elements being less than the power rating of said first element, and automatic control timing circuit means controlling switching elements to supply electric power to said second and third heating elements during a predetermined time period outside peak demand load hours so that a reduced constant demand is achieved.

2. A water heater as claimed in claim 1 wherein said heating elements are resistive heating rods disposed in a hot water tank.

3. A water heater as claimed in claim 2 wherein said first element is connected in an uppermost area of said reservoir for heating approximately 20% of water contained in said water reservoir, said second element being connected lowermost for heating all of said water in said reservoir, said third element being connected midrange to heat about 50% of said water in said reservoir.

4. A water heater as claimed in claim 1 wherein said automatic control timing circuit means comprises a timing element connected to said switching elements associated with each said heating element and having normally open contacts for connecting a power supply to its associated heating element when said open contacts are closed by a command signal from said timing element, said automatic control timing circuit means being independent of said power supply.

5. A water heater as claimed in claim 4 wherein said second and third heating elements are operated simultaneously by closing both associated switches, said first heating element being automatically switched off by said switch element when said second and third heating elements are switched on.

6. A water heater as claimed in claim 4 wherein said switches are single throw or double throw thermostatic switches.

* * * * *